United States Patent
Shastry et al.

(10) Patent No.: US 9,663,149 B2
(45) Date of Patent: May 30, 2017

(54) VEHICLE HOOD STIFFENER

(71) Applicant: Ford Global Technologies, LLC, Dearborn, MI (US)

(72) Inventors: Sushil Shastry, Swartz Creek, MI (US); Randall R. Frank, Dearborn, MI (US); Laike Misikir, Ann Arbor, MI (US); Luis Jesus Chavela Guerra, Mexico D.F. (MX); Kevin Greene, Shelby Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/670,803

(22) Filed: Mar. 27, 2015

(65) Prior Publication Data
US 2016/0280277 A1    Sep. 29, 2016

(51) Int. Cl.
| B62D 25/12 | (2006.01) |
| B62D 25/10 | (2006.01) |
| B62D 29/00 | (2006.01) |

(52) U.S. Cl.
CPC ........... *B62D 25/12* (2013.01); *B62D 25/105* (2013.01); *B62D 29/005* (2013.01)

(58) Field of Classification Search
CPC ..... B62D 25/12; B62D 25/105; B62D 29/005
USPC .................................................. 296/193.11
See application file for complete search history.

(56) References Cited

U.S. PATENT DOCUMENTS

| 5,605,371 | A | 2/1997 | Borchelt et al. |
| 6,048,022 | A * | 4/2000 | Ishibashi ............... B62D 21/15 |
| | | | 180/69.2 |
| 7,578,548 | B2 | 8/2009 | Behr et al. |
| 7,988,222 | B2 | 8/2011 | Fujimoto |
| 8,845,012 | B2 | 9/2014 | Sekikawa et al. |
| 2009/0026807 | A1* | 1/2009 | Wang ..................... B60R 21/34 |
| | | | 296/193.11 |
| 2011/0121608 | A1 | 5/2011 | Schmitz et al. |
| 2012/0285759 | A1 | 11/2012 | Ikeda et al. |
| 2014/0110971 | A1 | 4/2014 | Ray et al. |

FOREIGN PATENT DOCUMENTS

| CN | 101353061 | 1/2009 |
| JP | 2014094702 | 5/2014 |

* cited by examiner

*Primary Examiner* — Joseph D Pape
*Assistant Examiner* — Dana Ivey
(74) *Attorney, Agent, or Firm* — Jason C. Rogers; Bejin Bieneman PLC

(57) ABSTRACT

A vehicle hood includes an inner panel, an outer panel coupled to the inner panel, and an insert disposed between the outer panel and the inner panel. The insert is formed of a material that is brittle relative to a material of the outer panel. The insert includes a plurality of strips connected to each other. Each strip is elongated along and disposed adjacent to the outer panel.

20 Claims, 3 Drawing Sheets

VEHICLE HOOD STIFFENER

BACKGROUND

Vehicles, such as automobiles, are subject to a variety of performance tests, durability tests, and collision tests. These various tests may be standardized by individual vehicle manufactures and/or may be standardized by government agencies. Collision tests, for example, may be standardized by, or adopted by, various government agencies. For example, standardized automobile collision testing is regulated in the United States by the National Highway Transportation and Safety Administration (NHTSA) and is regulated in the Europe Union by the European New Car Assessment Programme (Euro NCAP).

These various performance tests, durability tests, and/or collision tests may create conflicting design factors for components of the vehicle. As one example, a hood of a vehicle may be subjected to both a palm print test, in which high rigidity of the hood may be beneficial, and a pedestrian protection test, in which high flexibility of the hood may be beneficial. Specifically, the palm print test tests the ability of the hood to resist plastic deformation in an area of the hood that is grasped by a user to move the hood from an open position to a closed portion. In order to prevent permanent deformation, it is beneficial to increase the rigidity of the hood in this area.

A pedestrian protection test standardized by the Euro NCAP tests the effect on the upper leg, the lower leg, and the head of a pedestrian involved with a front end impact of the vehicle. The results of the pedestrian protection test may be improved by increasing the flexibility of the hood of the vehicle such that the hood deforms to absorb energy from the pedestrian during impact.

Since the test results of the palm print test may be improved by increasing the rigidity of the hood, and the test results of the pedestrian protection test may be improved by increasing the flexibility of the hood, these two tests create conflicting demands on the design of the hood. As such, there remains an opportunity to design a vehicle hood that addresses these conflicting demands.

DETAILED DESCRIPTION

Figure 1:
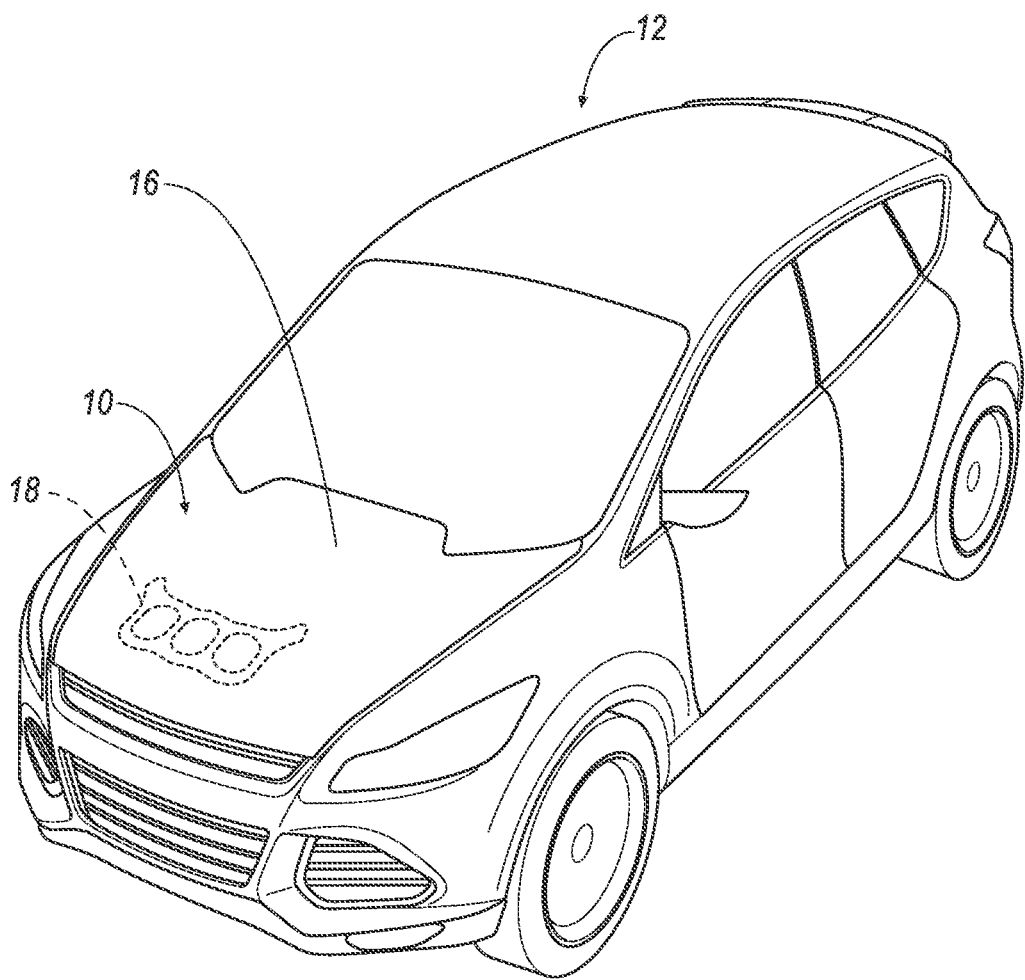
FIG. 1 is a perspective view of a vehicle including a hood with an insert shown in hidden lines.
Figure 2:
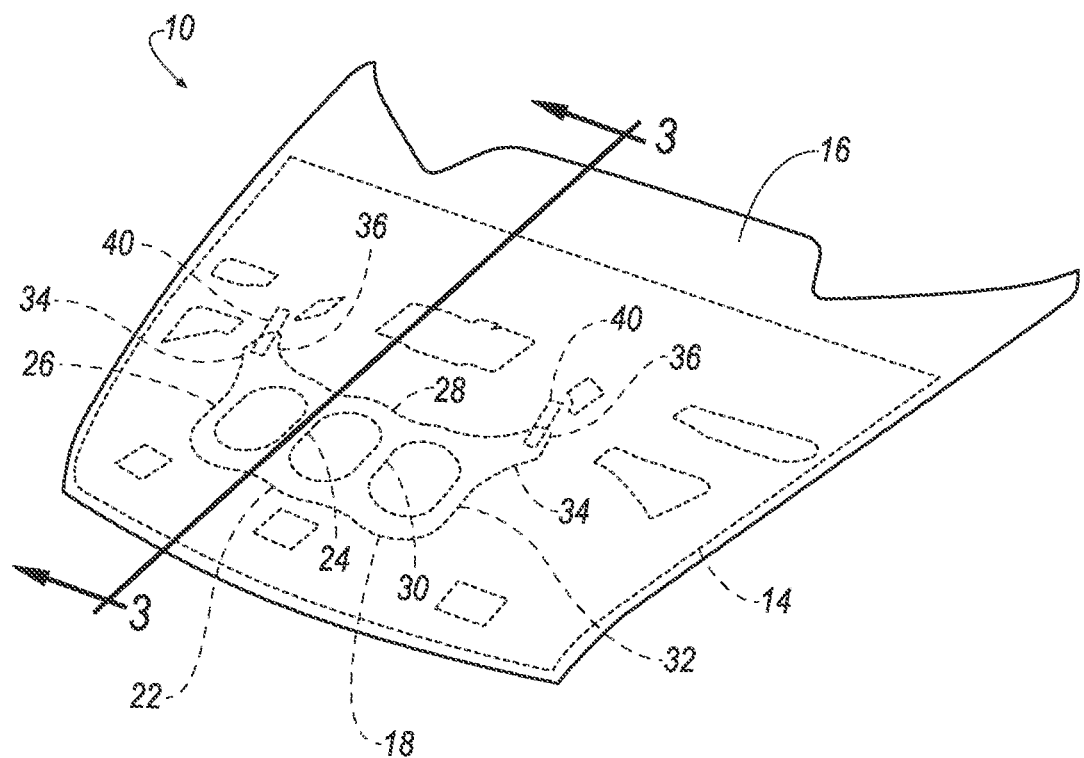
FIG. 2 is a perspective view of the hood including an outer panel and including an inner panel and the insert shown in hidden lines.
Figure 3:
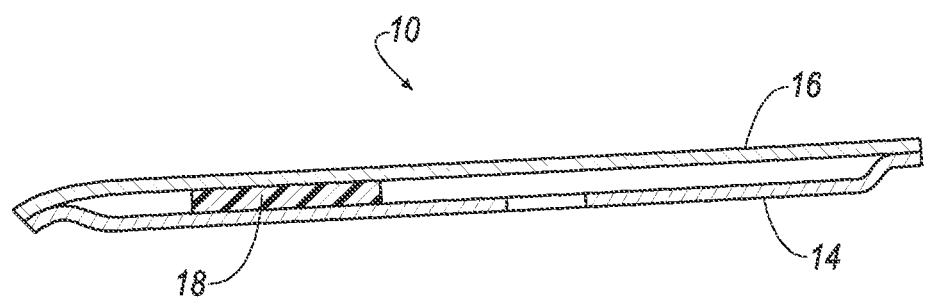
FIG. 3 is a cross-sectional view of the hood along line 3 of FIG. 2.
Figure 4:
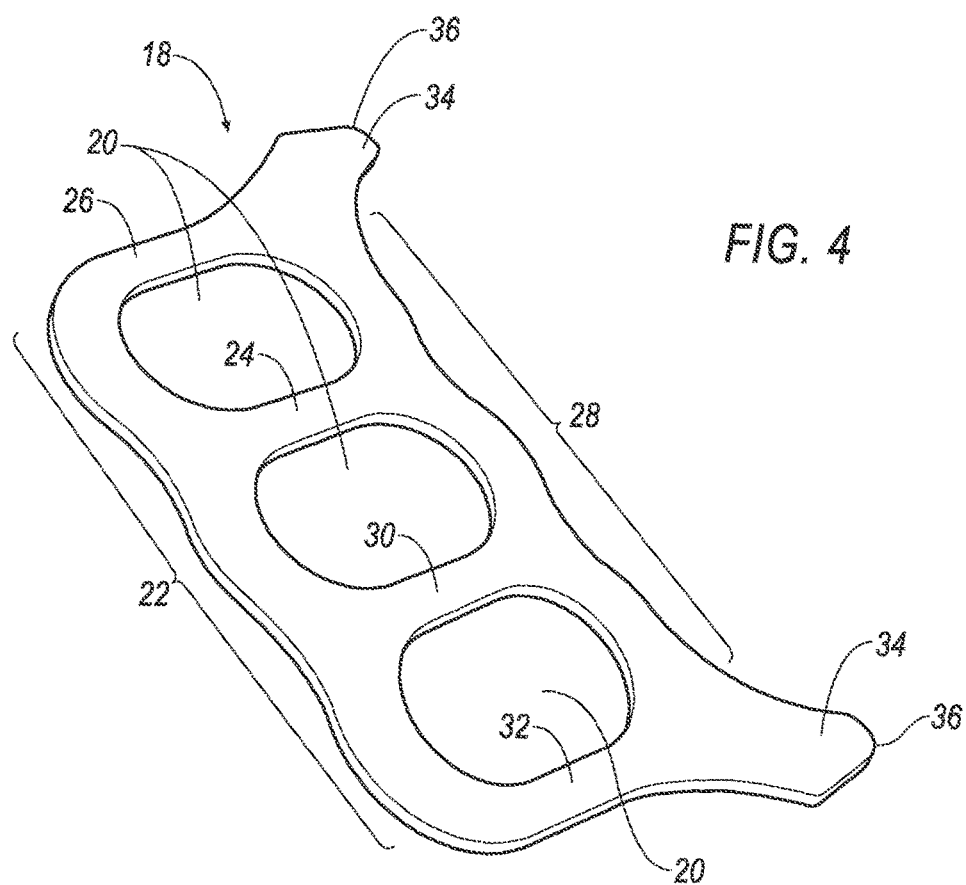
FIG. 4 is a perspective view of the insert.
Figure 5:
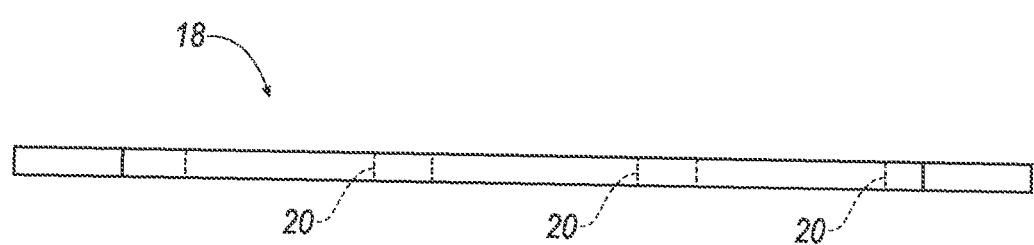
FIG. 5 is a side view of the insert.

With reference to the Figures, wherein like numerals indicate like parts throughout the several views, a hood 10 for a vehicle 12, e.g., an automobile, is generally shown. The hood 10 may also be referred to as a bonnet. The vehicle 12, including the hood 10, is generally shown in FIG. 1. With reference to FIGS. 2-3, the hood 10 includes an inner panel 14 and an outer panel 16 coupled to the inner panel 14. An insert 18, shown in isolation in FIGS. 4-5, is disposed between the outer panel 16 and the inner panel 14, as shown in FIG. 3. The insert 18 is formed of a material that is brittle relative to a material of the outer panel 16. The insert 18 includes a plurality of strips 22, 24, 26, 28, 30, 32 connected to each other. Each strip 22, 24, 26, 28, 30, 32 is elongated along and disposed adjacent to the outer panel 16.

Since the insert 18 is formed of a material that is brittle relative to the material of the outer panel 16, the insert 18 reinforces the outer panel 16 to prevent plastic deformation of the outer panel 16 when a force applied to the hood 10 at the insert 18 is below a predetermined threshold. If the force applied to the hood 10 at the insert 18 exceeds the predetermined threshold, the insert 18 breaks and allows the outer panel 16 to plastically deform. As such, the insert 18 may reinforce the outer panel 16 during a palm print test, i.e., to resist permanent deformation in an area of the hood 10 that is grasped by a user to move the hood 10 from an open position to a closed position. In other words, the insert 18 locally stiffens the outer panel 16 and adequately supports the outer panel 16 to handle palm print loads. During a pedestrian protection test, such as that standardized by the Euro NCAP, the force applied to the hood 10 at the insert 18 may exceed the predetermined threshold to break the insert 18 and allow the outer panel 16 to plastically deform to absorb energy.

With reference to FIGS. 4-5, the plurality of strips 22, 24, 26, 28, 30, 32 define at least one recess 20 between the strips 22, 24, 26, 28, 30, 32. Each recess 20 is disposed adjacent the outer panel 16, e.g., an axis of the recess 20 extends through the outer panel 16. The recesses 20 may extend through the insert 18, as shown in FIGS. 4-5. Alternatively, one or more of recesses 20 may be depressions in the surface of the insert 18, i.e., do not extend through the insert 18. The recesses 20 are shown in the Figures as being generally rectangular with rounded edges. Alternatively, the recesses 20 may have any suitable size and shape.

The insert 18 of FIGS. 4-5 includes three recesses 20 and, alternatively, the insert 18 may include any suitable number of recesses 20. With reference to FIG. 4, the insert 18 includes a plurality of strips that define the recesses 20. Specifically, the insert 18 includes a first strip 22, a second strip 24, a third strip 26, a fourth strip 28, a fifth strip 30, and a sixth strip 32. Each of the strips 22, 24, 26, 28, 30, 32 is elongated along the outer panel 16, i.e., is elongated along an axis generally parallel with the outer panel 16. This elongation of the strips 22, 24, 26, 28, 30, 32 along the outer panel 16 encourages the strips 22, 24, 26, 28, 30, 32 to break when subjected to a force exceeding the predetermined threshold. The elongation of the strips 22, 24, 26, 28, 30, 32 may be designed to tune the performance of the insert 18, e.g., to tune the predetermined threshold force at which the insert 18 breaks. As one example, one or more of the strips 22, 24, 26, 28, 30, 32 may include an area of decreased cross-sectional area to design and/or tune the predetermined threshold force at which the insert 18 breaks.

The fourth strip 28 is spaced from the first strip 22, and is connected to and extends transverse to the second, third, fifth, and sixth strips 24, 26, 30, 32. The second strip 24 is connected to and extends transverse to the first and fourth strips 22, 28. The third strip 26 is spaced from the second strip 24, and is connected to and extends transverse to the first and fourth strips 22, 28. The fifth strip 30 is spaced from the second and third strips 24, 26, and is connected to and extends transverse to the first and fourth strips 22, 28. The sixth strip 32 is spaced from the second, third, and fifth strips 24, 26, 30, and is connected to and extends transverse to the first and fourth strips 22, 28.

With continued reference to FIG. 4, the second, third, fifth, and sixth strips 24, 26, 30, 32 may extend generally in parallel to each other. The first and fourth strips 22, 28 may extend generally in parallel to each other. The first and fourth strips 22, 28 may extend generally perpendicular to the second, third, fifth and sixth strips 24, 26, 30, 32. Alternatively, the strips 22, 24, 26, 28, 30, 32 may be arranged at any suitable orientation relative to each other. The strips 22, 24, 26, 28, 30, 32 may be oriented and positioned relative to each other to tune the performance of the insert 18, e.g., to tune the predetermined threshold force at which the insert 18 breaks.

As set forth above, the strips 22, 24, 26, 28, 30, 32 define one or more recesses 20. Specifically, the first, second, third, and fourth strips 22, 24, 26, 28 define a recess 20 therebetween. The first, second, fourth, and fifth strips 22, 24, 28, 30 define a recess 20 therebetween. The first, fourth, fifth, and sixth strips 22, 28, 30, 32 define a recess 20 therebetween.

The insert 18 includes at least one wing 34 elongated along the outer panel 16. The insert 18 shown in the figures includes two wings 34, however, the insert 18 may include any suitable number of wings 34. The wings 34 may increase the stiffness of the insert 18, and may be located and oriented to tune the performance of the insert 18, e.g., to tune the predetermined threshold force at which the insert 18 breaks.

The wing 34 is cantilevered from at least one of the strips 22, 24, 26, 28, 30, 32 before assembly between the outer panel 16 and the inner panel 14. In other words, the wing 34 extends from at least one of the strips 22, 24, 26, 28, 30, 32 to the free end 36 spaced from the strips 22, 24, 26, 28, 30, 32. The free end 36 is free from the strips 22, 24, 26, 28, 30, 32, but may be supported by at least one of the outer panel 16 and the inner panel 14 when the insert 18 is assembled with the outer panel 16 and the inner panel 14. The insert 18 shown in the figures, for example, includes one wing 34 extending transversely from the intersection of the third and fourth strips 26, 28 to a free end 36, and another wing 34 extending transversely from intersection of the fourth and sixth strips 26, 32 to a free end 36.

The wing 34 may be adhered and/or bonded to the outer panel 16. For example, as shown in FIG. 2, adhesive 40 may adhere the wing 34 to the outer panel 16. The adhesive may be, for example, mastic. In addition or in the alternative to the adhesive between the wing 34 and the outer panel 16, the wing 34 may be adhered and/or bonded to the inner panel 14. Any portion of the insert 18, in addition to or in the alternative to the wing 34, may be adhered and/or bonded to the inner panel 14 and/or the outer panel 16 with any suitable type of adhesive.

The plurality of strips 22, 24, 26, 28, 30, 32 may be integrally formed with each other. In other words, the strips 22, 24, 26, 28, 30, 32 may be formed together simultaneously as a single continuous unit. Alternatively, the strips 22, 24, 26, 28, 30, 32 may be formed separately and subsequently joined together. The wings 34 may be integrally formed with the strips 22, 24, 26, 28, 30, 32.

The insert 18 may match the shape of the outer panel 16. The insert 18 may, for example, be generally planar. As set forth further below, the insert 18 may abut the outer panel 16.

At least one of the strips 22, 24, 26, 28, 30, 32 is designed to reinforce the outer panel 16 when subjected to a force below the predetermined threshold and is designed to break when subjected to a force above the predetermined threshold. As set forth above, several features of the strips 22, 24, 26, 28, 30, 32 may be designed to tune the predetermined threshold force at which the insert 18 breaks. For example, the elongation of the strip 22, 24, 26, 28, 30, 32, cross-sectional of the strip 22, 24, 26, 28, 30, 32, and the location and orientation of the strips 22, 24, 26, 28, 30, 32 relative to each other may be designed to tune the predetermined threshold force at which the insert 18 breaks.

The outer panel 16 is designed to plastically deform when at least one of the strips 22, 24, 26, 28, 30, 32 breaks when subjected to a force above the predetermined threshold. As such, the insert 18 not only supports the outer panel 16 for palm print loading requirements, but also allows controlled deformation of outer panel 16 during frontal loading for a pedestrian protection test, e.g., leg and headform loading conditions.

The insert 18 may be formed from a fibers encapsulated by a polymer. In other words, the polymer may surround and/or bind to the fibers. For example, the polymer may be an epoxy. As another example, the polymer may be plastic, vinyl, etc. The fibers may, for example, be formed of glass, carbon, etc. The fibers may be arranged together as a mat, which may be encapsulated by the polymer. The fiber may be of any suitable fiber configuration, such as, continuous, chopped, woven, etc.

The outer panel 16 may be formed of metal. For example, the outer panel 16 may be formed from any suitable type of steel. As another example, the outer panel 16 may be formed from any suitable type of aluminum. The inner panel 14 may be formed of the same type of material as the outer panel 16. The outer panel 16 may be coupled to the inner panel 14 in any suitable fashion, e.g., the outer panel 16 may be directly fixed to the inner panel 14 or fixed relative to the inner panel 14 via an intermediate component. The outer panel 16 may cover the inner panel 14 to provide an aesthetic exterior appearance to the vehicle 12.

The insert 18 may be trapped between the outer panel 16 and the inner panel 14, as shown in FIG. 3. For example, the insert 18 may abut both the outer panel 16 and the inner panel 14. As set forth above, in addition, or in the alternative, the insert 18 may be fixed to one or both of the outer panel 16 and the inner panel 14 by bonding, adhering, etc.

Before assembly between the outer panel 16 and the inner panel 14, the insert 18 may be flexible relative to the outer panel 16 and the inner panel 14. The insert 18 may be heat reactive to increase in rigidity and to become brittle relative to the outer panel 16 and the inner panel 14 when heated. As one example, the insert 18 may be taped and/or adhered to at least one of the outer panel 16 and the inner panel 14 during vehicle 12 assembly and before the vehicle 12 is introduced into a paint booth. When the vehicle 12 is then introduced into the paint booth, the heat in the paint booth may cause a chemical reaction in the material of the insert 18 to increase the rigidity and brittleness of the insert 18. The insert 18 may also expand when heated and, in such a configuration, may be pinched between the outer panel 16 and inner panel 14 when expanded.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A vehicle hood comprising:
an inner panel;
an outer panel coupled to the inner panel; and
an insert disposed between the outer panel and the inner panel and formed of a material that is brittle relative to a material of the outer panel;

the insert including a plurality of strips connected to each other, each strip having a thickness from the outer panel toward the inner panel, and each strip having a width and a length greater than the thickness.

2. The vehicle hood as set forth in claim 1 wherein the plurality of strips define recesses between the strips adjacent the outer panel.

3. The vehicle hood as set forth in claim 1 wherein the strips are designed to break when subjected to a force above a predetermined threshold.

4. The vehicle hood as set forth in claim 1 wherein the strips are designed to reinforce the outer panel when subjected to a force below a predetermined threshold and are designed to break when subjected to a force above the predetermined threshold.

5. The vehicle hood as set forth in claim 4 wherein the outer panel is designed to plastically deform when at least one of the strips breaks when subjected to a force above the predetermined threshold.

6. The vehicle hood as set forth in claim 1 wherein the insert is formed from a glass mat encapsulated by a polymer.

7. The vehicle hood as set forth in claim 1 wherein the outer panel is formed from steel.

8. The vehicle hood as set forth in claim 1 wherein the outer panel is formed from aluminum.

9. The vehicle hood as set forth in claim 1 wherein the insert includes at least one wing elongated along the outer panel.

10. The vehicle hood as set forth in claim 1 wherein the plurality of strips are integrally formed with each other.

11. The vehicle hood as set forth in claim 1 wherein the insert is planar.

12. A vehicle hood comprising:
an inner panel;
an outer panel coupled to the inner panel; and
an insert disposed between the outer panel and the inner panel and formed of a material that is brittle relative to a material of the outer panel;
the insert including a first strip and a second strip connected to and extending transverse to the first strip, the first strip and the second strip each having a thickness from the outer panel toward the inner panel, and the first strip and the second strip each having a width and a length greater than the thickness.

13. The vehicle hood as set forth in claim 12 wherein the insert includes a third strip spaced from the second strip and connected to and extending transverse to the first strip.

14. The vehicle hood as set forth in claim 13 wherein the insert includes a fourth strip spaced from the first strip and connected to and extending transverse to the second and third strips defining a recess between the first, second, third, and fourth strips.

15. The vehicle hood as set forth in claim 14 wherein the insert includes a fifth strip spaced from the second strip and third strips, the fifth strip being connected to and extending transverse to the first and fourth strips defining another recess between the first, second, fourth, and fifth strips.

16. The vehicle hood as set forth in claim 15 wherein the second, third, and fifth strips extend generally in parallel to each other and wherein the first and fourth strips extend generally in parallel to each other.

17. The vehicle hood as set forth in claim 12 wherein at least one of the first strip and the second strip are designed to reinforce the outer panel when subjected to a force below a predetermined threshold and are designed to break when subjected to a force above the predetermined threshold.

18. A vehicle hood comprising:
an inner panel;
an outer panel coupled to the inner panel; and
an insert disposed between the outer panel and the inner panel and formed of a material that is brittle relative to a material of the outer panel;
the insert including a plurality of strips extending along the outer panel and designed to break when subjected to a force above a predetermined threshold, the strips having a thickness from the outer panel toward the inner panel, and the strips having a width and a length greater than the thickness.

19. The vehicle hood as set forth in claim 18 wherein the outer panel is designed to plastically deform when at least one of the strips breaks when subjected to a force above the predetermined threshold.

20. The vehicle hood as set forth in claim 18 wherein the insert is formed from a glass mat encapsulated by a polymer and wherein the outer panel is formed of at least one of steel and aluminum.

\* \* \* \* \*